United States Patent [19]

Komuro et al.

[11] Patent Number: 4,698,273

[45] Date of Patent: Oct. 6, 1987

[54] MULTI-LAYERED FERROMAGNETIC FILM AND METHOD OF MANUFACTURING THE SAME

[75] Inventors: Matahiro Komuro, Hitachi; Yuzo Kozono, Hitachi-oota; Takeshi Yasuda, Hitachi; Shinji Narishige; Masanobu Hanazono, both of Mito; Tetsuro Kuroda, Takahagi, all of Japan

[73] Assignee: Hitachi, Ltd., Tokyo, Japan

[21] Appl. No.: 918,333

[22] Filed: Oct. 14, 1986

[30] Foreign Application Priority Data

Oct. 11, 1985 [JP] Japan .................. 60-224758

[51] Int. Cl.$^4$ .................. G11B 5/66; C23C 14/14
[52] U.S. Cl. .................. 428/635; 428/682; 428/928; 204/192.2; 427/132
[58] Field of Search ............... 428/635, 682, 928, 611; 427/132, 130, 131; 204/192.2; 148/122

[56] References Cited

U.S. PATENT DOCUMENTS

| | | | |
|---|---|---|---|
| 2,920,381 | 1/1960 | Bozorth et al. | 428/928 |
| 3,375,091 | 3/1968 | Feldkeller | 428/635 |
| 4,103,315 | 7/1978 | Hempstead et al. | 428/928 |
| 4,610,935 | 9/1986 | Kumasaka et al. | 428/635 |

OTHER PUBLICATIONS

C. L. Fu, J. Freeman, and T. Oguchi, "Prediction of Strongly Enhanced Two-Dimensional Ferromagnetic Moments on Metallic Overlayers, Interfaces, and Superlattices", (Physical Review Letters, vol. 54, No. 25, pp. 2700-2703).

Nobuo Kawamiya, Kengo Adachi and Yoji Nakamura, "Magnetic Properties and Mössbauer Investigation of Fe-Ga Alloys, (Journal of the Physical Society of Japan, vol. 33, No. 5, Nov. 1972, pp. 1318-1327).

Primary Examiner—Melvyn J. Andrews
Assistant Examiner—John Zimmerman
Attorney, Agent, or Firm—Antonelli, Terry & Wands

[57] ABSTRACT

The film is composed of an alternate lamination of unit iron layers and unit layers of ferromagnetic iron compound such as $Fe_3Al$, $Fe_3Si$, $Fe_3Ge$ and $Fe_3Ga$. The thickness of the both unit layers is less than 70 Å. The film has a high saturation magnetization more than 230 emu/g and a high thermal stability so that the film is particularly applicable to a magnetic head core.

10 Claims, 5 Drawing Figures

MULTI-LAYERED FERROMAGNETIC FILM AND METHOD OF MANUFACTURING THE SAME

The present invention relates to a multi-layered ferromagnetic film having a high saturation magnetization and a method of manufacturing the same, which is applicable, for example, to a magnetic head core and a recording medium such as a magnetic disc and a magnetic tape.

BACKGROUND OF THE INVENTION

The saturation magnetization of a ferromagnetic film is determined by the total vector sum of magnetic moments per iron atoms included in the ferromagnetic film. The magnetic moment per iron atom of a pure stable iron is about 2.2 $\mu_B$ (Bohr magneton) which is increasable when the interatomic distance of the pure stable iron, in other words lattice constant thereof, is increased. One known method of increasing the interatomic distance is effected to force to dissolve nitrogen atoms in solid state into the pure stable iron. The other known method is to grow iron on a simple metal which has a larger interatomic distance than iron and to increase the interatomic distance at the interface thereof as disclosed, for example, in C. L. Fu, J. Freeman, and T. Oguchi "Prediction of Strongly Enhanced Two-Dimensional Ferromagnetic Moments on Metallic Overlayers, Interfaces, and Superlattices" (PHYSICAL REVIEW LETTERS, volume 54, Number 25, pp 2700–2703), wherein an increase of magnetic moment per iron atom is predicted by growing iron on Copper (Cu), Silver (Ag) an Gold (Au) which have a larger interatomic distance than that of iron. However since Copper, Silver and Gold are non-ferromagnetic metals, a saturation magnetization of the combined film in total comprising a lamination of Copper, Silver or Gold layers and iron layers decreases below that of an iron film alone.

SUMMARY OF THE INVENTION

One of the object of the present invention is to provide a multi-layered ferromagnetic film having a comparable or higher saturation magnetization than that of an iron film alone.

Another object of the present invention is to provide a method of manufacturing a multi-layered ferromagnetic film having a comparable or higher saturation magnetization than that of an iron film alone.

A multi-layered ferromagnetic film of the present invention comprises an alternate lamination of unit iron layers and unit ferromagnetic iron compound layers.

Although $\gamma_2$ phase iron is in a semi-stable phase, the $\gamma_2$ phase iron has a lattice constant larger than that of a stable body centered cubic (bcc) structure iron, thus has a larger magnetic moment per iron atom (2.8 $\mu_B$) than that of the stable bcc structure iron (2.2 $\mu_B$) used for the unit iron layers.

For the unit ferromagnetic iron compound layers, ferromagnetic iron compounds such as $Fe_3Al$, $Fe_3Si$, $Fe_3Ge$, $Fe_3Ga$, $Fe_3Pt$ and $Fe_3Sn$ are used, which have a high thermal stability and a large lattice constant close to the semi-stable $\gamma_2$ phase iron.

Since the lattice constant of the ferromagnetic iron compound is larger than that of the pure stable iron, the interatomic distance of the unit iron layer deposited on the unit ferromagnetic iron compound layer is enlarged thus to increase the magnetic moment per iron atom included in the unit iron layer.

Magnetic moments per iron atom of $Fe_3Al$, $Fe_3Si$, $Fe_3Ge$ and $Fe_3Ga$ are illustrated on Table 1, which is extracted from Table 2 of Nobuo KAWAMIYA, Kengo ADACHI and Yoji NAKAMURA "Magnetic Properties and Mössbauer Investigation of Fe-Ga Alloys (Journal of the Physical Society of Japan, Vol. 33, No.5 November, 1972, pp 1318–1327).

TABLE 1

| Iron Compound | | Crystal Structure | Magnetic Moment Per Fe Atom ($\mu B$) at 0° K. | |
|---|---|---|---|---|
| $Fe_3A$ | A | bcc | 1.65 | (2.03) |
|  | D |  | 2.35 |  |
| $Fe_3Si$ | A | bcc | 1.28 | (1.89) |
|  | D |  | 2.37 |  |
| $Fe_3Ge$ |  | hexagonal | 2.2 | (2.20) |
| $Fe_3Ga$ | A | bcc | 1.5 | (2.17) |
|  | D |  | 2.7 |  |
| $Fe_3Ga$ |  | fcc | 2.4 | (2.4) |

D represents D site sublattice.
bcc represents body centered cubic.
fcc represents face centered cubic.
( ) represents average magnetic moment per Fe atom.

As seen from Table 1 the magnetic moments per iron atom in the ferromagnetic iron compounds depend on an atomic configuration of iron atom, the maximum magnetic moment per iron atom in the ferromagnetic iron compounds are larger than that of the pure stable iron (2.2 $\mu_B$).

Because of the large magnetic moments per iron atom of the ferromagnetic iron compounds, the saturation magnetization of the multi-layered ferromagnetic film as a whole of the present invention, which is formed through an alternate lamination of the unit ferromagnetic iron compound layers and the unit iron layers, is also enhanced.

A variation of the thickness of the unit iron layer, in other words, the distance from the lower unit ferromagnetic iron compound layer, greatly affects the magnetic moment per iron atom in the unit iron layer, since the lattice constant or the interatomic distance of iron atom of the lower unit ferromagnetic iron compound layer controls that in the unit iron layer.

Inventors found out that the unit iron layer having a thickness more than 70 Å does not substantially increase the saturation magnetization of the multi-layered ferromagnetic film as a whole and layer having a thickness less than 50 Å greatly enhances the saturation magnetization thereof. The minimum thickness of the unit iron layer is that of the single atom layer, in that, 2–3 Å.

The alternate lamination of the unit ferromagnetic iron compound layers and the unit iron layers of the present invention is preferably subjected to a first heat treatment at a temperature of 200°–300° C. in a vacuum for a predetermined time so as to stabilize and match the interfaces between the unit iron layers and the unit ferromagnetic iron compound layers and to further enhance the saturation magnetization of the multi-layered ferromagnetic film as a whole of the present invention.

Further the alternate lamination of the unit ferromagnetic iron compound layers formed of $Fe_3Ga$ containing 20–35 atomic % of Ga and unit iron layers is preferably subjected to a second heat treatment at a temperature of 500°–800° C. so as to stabilize the face centered cubic (fcc) ordered lattice structure in the unit ferromagnetic Fe$_3$Ga layers and to further enhance the saturation magnetization of the multi-layered ferromagnetic film as a whole of the present invention.

Further the total thickness of the multi-layered ferromagnetic film for use as the magnetic head core is preferably more than 1000 Å.

DESCRIPTION OF THE PREFERRED EMBODIMENTS

The sputtering method was used to form the alternate lamination of the unit iron layers and the unit ferromagnetic iron compound layers. First, the ferromagnetic iron compound such as Fe$_3$Al, Fe$_3$Si, Fe$_3$Ge and Fe$_3$Ga was deposited by sputtering on a mono-crystalline silicon substrate, then, the iron was deposited by sputtering on the previously deposited unit ferromagnetic iron compund layer. The deposition of the ferromagnetic iron compound and the iron was alternately repeated to form the multi-layered ferromagnetic film. The sputtering conditions of the ferromagnetic iron compound and iron are illustrated in Table 2. The sputtering conditions are modified depending on the materials to be sputtered.

TABLE 2

| Substrate | Mon-crystalline Si |
|---|---|
| Temperature of substrate | 150° C. |
| Initial degree of vacuum | <1.0 × 10$^{-4}$ Pa |
| Input power | 0.5 to 1.5 kW |
| Pressure of Ar gas | 67–0.67 Pa |
| Ratio of two unit layer thickness | 1:1 |

Figure 1:
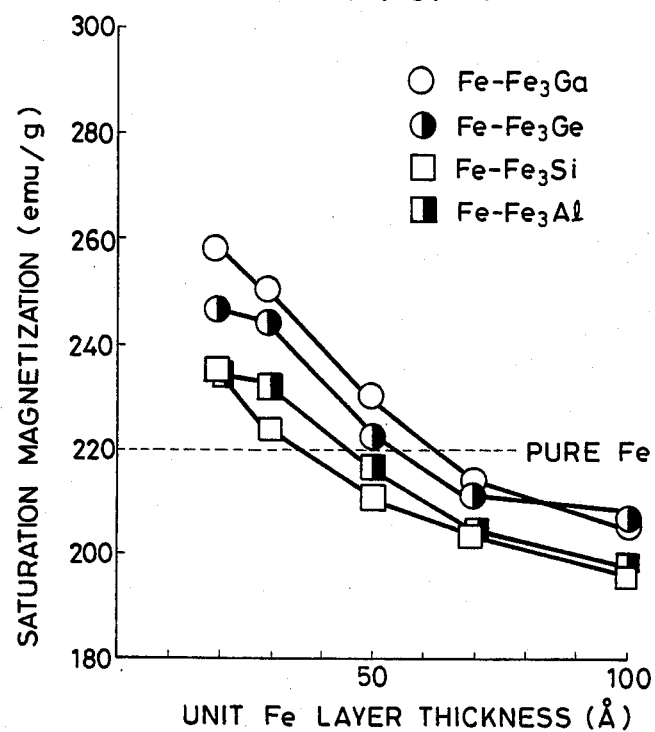
FIG. 1 is a characteristic diagram showing the relationship between the saturation magnetization and the unit Fe layer thickness of the multi-layered ferromagnetic film of the present invention.

The saturation magnetizations of multi-layered ferromagnetic Fe-Fe$_3$Al, Fe-Fe$_3$Si, Fe-Fe$_3$Ge and Fe-Fe$_3$Ga films thus produced with varying unit Fe layer thickness and while keeping the ratio of the two units layer thickness as 1:1 were measured by a vibrating sample magnetometer (VSM) and are illustrated in FIG. 1.

As seen from FIG. 1, when the unit Fe layer thickness is reduced, the saturation magnetizations of the respective multi-layered ferromagnetic films increase. When the unit Fe layer thickness is reduced less than 70 Å, the saturation magnetizations of the respective multi-layered ferromagnetic films suddenly increase. The multi-layered ferromagnetic Fe-Fe$_3$Ga film with unit Fe layer thickness of 20 Å showed a saturation magnetization of 258 emu/g. When the unit Fe layer thickness of the respective multi-layered ferromagnetic films is reduced less than 30 Å, the saturation magnetizations of multi-layered ferromagnetic Fe-Fe$_3$Al, Fe-Fe$_3$Si, Fe-Fe$_3$Ge and Fe-Fe$_3$Ga films exceed that of the pure Fe film as indicated by the dotted line in FIG. 1. Further with respect to the respective multi-layered ferromagnetic films with the same unit Fe layer thickness, the multi-layered ferromagnetic Fe-Fe$_3$Ga film showed the highest saturation magnetization and followed by multi-layered ferromagnetic Fe-Fe$_3$Ge, Fe-Fe$_3$Si and Fe-Fe$_3$A films which trend partly corresponds to the average magnetic moments per iron atoms of respective ferromagnetic iron compounds themselves as shown in Table 1.

Figure 2:
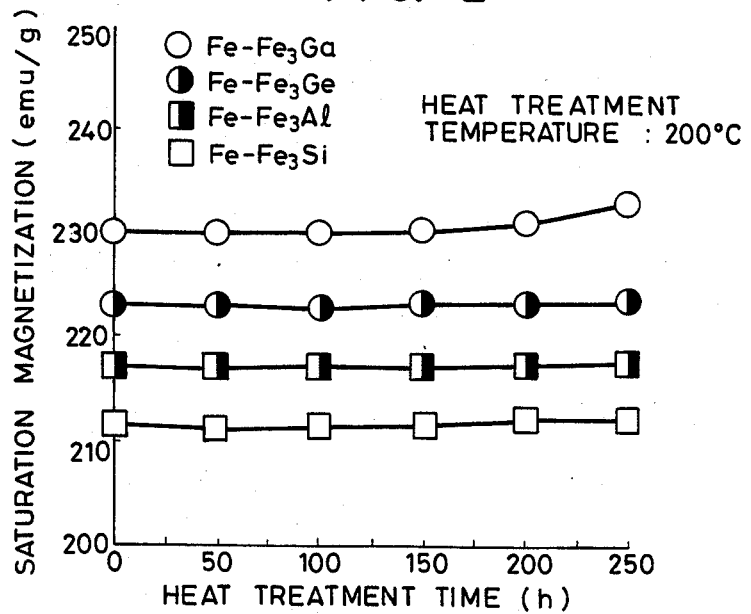
FIG. 2 is a characteristic diagram showing the relationship between the saturation magnetization and the heat treatment time of the multi-layered ferromagnetic film of the present invention.

The respective multi-layered ferromagnetic films with the unit Fe layer thickness of 50 Å were heat treated at a temperature of 200° C. in vacuum so as to stabilize and match the interfaces between the unit Fe layers and the unit ferromagnetic iron compound layers. FIG. 2 shows the effects of the low temperature heat treatment on the saturation magnetization of the multi-layered ferromagnetic Fe-Fe$_3$Al, Fe-Fe$_3$Si, Fe-Fe$_3$Ge and Fe-Fe$_3$Ga films. As seen from FIG. 2 the saturation magnetizations of the films increase with the increase of the heat treatment time.

Figure 3:
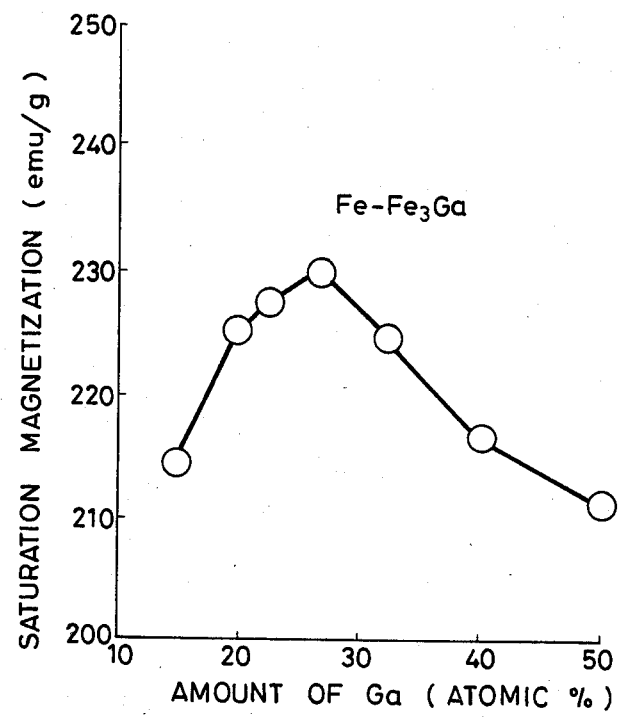
FIG. 3 is a characteristic diagram showing the relationship between the saturation magnetization and the amout of Ga in the unit ferromagnetic Fe$_3$Ga layer of the multi-layered ferromagnetic Fe-Fe$_3$Ga film of the present invention.

Upon production of the multi-layered ferromagnetic Fe-Fe$_3$Ga film with unit Fe layer thickness of 50 Å, Ga content in Fe$_3$Ga sputtering target was varied in the range of 15 to 50 atomic % to see the effects of the Ga content on the saturation magnetization of the multi-layered ferromagnetic Fe-Fe$_3$Ga film as a whole. FIG. 3 is the results of the investigation. As seen from FIG. 3, when the Ga content is less than 27 atomic %, the saturation magnetization of the multi-layered ferromagnetic Fe-Fe$_3$Ga film increases with the increase in Ga content, but when the Ga content exceeds 27 atomic %, the saturation magnetization decreases with the increase in Ga content. The Ga content in Fe$_3$Ga sputtering target which exhibits a higher saturation magnetization than that of the pure iron film is in the range of 20 to 35 atomic %.

Figure 4:
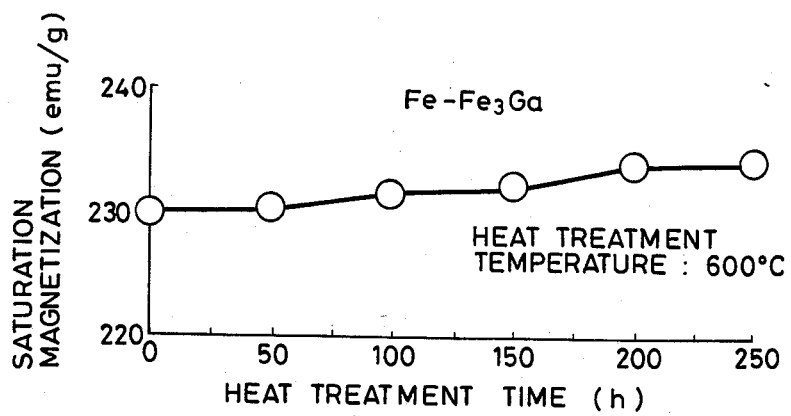
FIG. 4 is a characteristic diagram showing the relationship between the saturation magnetization and the heat treatment time of the multi-layered ferromagnetic Fe-Fe$_3$Ga film of the present invention.

A multi-layered ferromagnetic Fe-Fe$_3$Ga film with unit Fe layer thickness of 50 Å and formed by using Fe$_3$Ga sputtering target containing 27 atomic % Ga was heat-treated at a temperature of 600° C. in vacuum to stabilize the fcc ordered lattices in the unit ferromagnetic Fe$_3$Ga layers and to further increase the saturation magnetization of the film. FIG. 4 shows the effects of the heat treatment on the saturation magnetization of the film as a whole. As seen from FIG. 4, the saturation magnetization of the film increases with the increase of the heat treatment time. Substantially the same effects were obtained with the heat treatment of the multi-layered ferromagnetic films at a temperature of 500°–800° C.

Further, without subjecing the alternate lamination of the unit ferromagnetic iron compound layers and the unit iron layers together with the substrate to at least one heat treatment explained above, substantially the same effects was obtained by heating up the substrate at a temperature 150°–400° C. during the sputtering operation.

Figure 5:
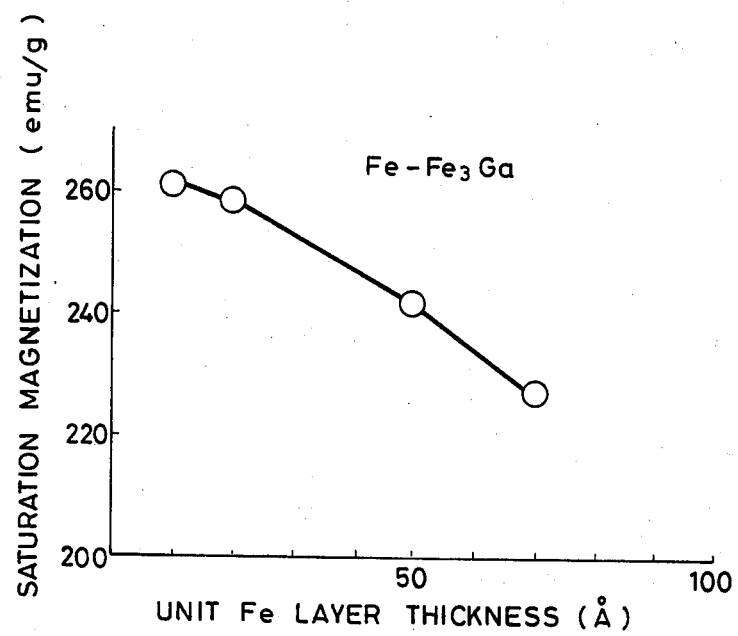
FIG. 5 is a characteristic diagram showing the relationship between the saturation magnetization and the unit Fe layer thickness of the multi-layered ferromagnetic Fe-Fe$_3$Ga film of the present invention manufactured under a modified condition from that for the multi-layered ferromagnetic Fe-Fe$_3$Ga film shown in FIG. 1.

Multi-layered ferromagnetic Fe-Fe$_3$Ga films with varying unit Fe layer thickness were formed on the substrate which was kept at a temperature of 400° C. during the sputtering operation. The saturation magnetizations of the multi-layered ferromagnetic Fe-Fe$_3$Ga film thus produced are illustrated in FIG. 5, which shows an improvement of the saturation magnetization over that of the non-heat-treated multi-layered ferromagnetic Fe-Fe$_3$Ga film as illustrated in FIG. 1.

We claim:

1. A multi-layered ferromagnetic film comprising a plurality of unit iron layers and a plurality of unit ferromagnetic iron compound layers which are laminated alternately, said unit ferromagnetic iron compound layer essentially consists of at least one compound selected from the group consisting of Fe$_3$Al, Fe$_3$Si, Fe$_3$Ge, Fe$_3$Ga, Fe$_3$Pt and Fe$_3$Sn.

2. A multi-layered ferromagnetic film according to claim 1, wherein the thickness of said unit iron layer is less than 70 Å.

3. A multi-layered ferromagnetic film according to claim 2, wherein the thickness of said unit ferromagnetic iron compound layer is less than 70 Å.

4. A multi-layered ferromagnetic film according to claim 3, wherein said unit ferromagnetic iron compound layer is Fe$_3$Ga containing 20–35 atomic % of Ga.

5. A method of manufacturing a multi-layered ferromagnetic film comprising:
    a step of depositing a ferromagnetic iron compound on a substrate to form a unit ferromagnetic iron compound layer with a predetermined thickness, said ferromagnetic iron compound essentially consists of at least one compound selected from the group consisting of Fe$_3$Al, Fe$_3$Si, Fe$_3$Ge, Fe$_3$Ga, Fe$_3$Pt and Fe$_3$Sn;
    a step of depositing an iron layer on said unit ferromagnetic iron compound layer to form a unit iron layer with a predetermined thickness;
    a step of depositing the ferromagnetic iron compound on said unit iron layer to form another unit ferromagnetic iron compound layer with a predetermined thickness; and
    a step of repeating said second and third depositing steps so as to form an alternate lamination of said unit ferromagnetic iron compound layers and said unit iron layers whereby the magnetic moment per iron atom in said unit iron layer is enhanced due to an increase of interatomic distance in said unit iron layer.

6. A method of manufacturing a multi-layered ferromagnetic film according to claim 5, further comprising a step of subjecting said alternate lamination to a first heat treatment at a temperature of 200°–300° C. for a predetermined time in vacuum so as to stabilize the interfaces between said unit iron layers and said unit ferromagnetic iron compound layers, whereby the saturation magnetization of said multi-layered ferromagnetic film is enhanced.

7. A method of manufacturing a multi-layered ferromagnetic film according to claim 6, further comprising a step of subjecting said first heat treated alternate lamination to a second heat treatment at a temperature of 500°–800° C. for a predetermined time in vacuum so as to stabiize ordered lattices in said unit ferromagnetic iron compound layers whereby the saturation magnetization of said multi-layered ferromagnetic film is further enhanced.

8. A method of manufacturing multi-layered ferromagnetic film according to claim 5, further comprising a step of subjecting said alternate lamination to a heat treatment at a temperature of 500°–800° C. for a predetermined time in vacuum so as to stabilize ordered lattices in said unit ferromagnetic iron compound layers whereby the saturation magnetization of said multi-layered ferromagnetic film is enhanced.

9. A method of manufacturing multi-layered ferromagnetic film according to claim 5, further comprising a step of maintaining said substrate at a temperature of 150°–400° C. during said depositing steps of said ferromagnetic iron compound and said iron so as to stabilize the interfaces between said unit iron layers and said unit ferromagnetic iron compound layers, whereby the saturation magnetization of said multi-layered ferromagnetic film is enhanced.

10. A method of manufacturing a multi-layered ferromagnetic film according to claim 5, wherein said ferromagnetic iron compound is Fe$_3$Ga containing 20–35 atomic % of Ga, and the thicknesses of said unit ferromagnetic iron compound layer and said unit iron layer are respectively less than 70 Å.

* * * * *